FIG. 1

ARTHUR BERESFORD MIDDLETON
*INVENTOR.*

BY
Attorney

FIG. 2

ARTHUR BERESFORD MIDDLETON
INVENTOR.

FIG. 3

ARTHUR BERESFORD MIDDLETON
INVENTOR.

ARTHUR BERESFORD MIDDLETON
INVENTOR

ARTHUR BERESFORD MIDDLETON
*INVENTOR*

BY
Attorney

Patented July 12, 1949

2,476,208

UNITED STATES PATENT OFFICE 2,476,208

SINTERED PRECIOUS METAL PRODUCT

Arthur Beresford Middleton, Finchley, London, England, assignor to The International Nickel Company, Inc., New York, N. Y., a corporation of Delaware Application October 26, 1944, Serial No. 560,487
In Great Britain October 28, 1943

2 Claims. (Cl. 75—22)

This invention relates to new and useful improvements in spark plugs for ignition purposes in internal combustion engines and, more particularly, to new and useful improvements in precious metal or precious metal alloy electrodes for use in such spark plugs.

The use of electrodes made from precious metals or precious metal alloys for the spark plugs of high efficiency internal combustion engines, such as those used in airplanes, is well known. Platinum-tungsten, platinum-iridium, platinum-rhodium, platinum-molybdenum, and platinum-tin are examples of such alloys.

The conditions to which spark plugs are subjected, particularly in their use in high efficiency airplane engines, are unusually severe and the electrodes of precious metals or precious metal alloys as heretofore used were liable to fail under the severe operating conditions which were encountered. Fuels which are used in modern, high efficiency airplane engines generally contain an amount of lead compounds and the penetration of these lead compounds into the electrodes of the prior art has been one of the causes of failure. Furthermore, the electrodes of the prior art had a tendency to recrystallize during use and this recrystallization induced brittleness in the electrode leading to its failure in use.

I have discovered that an electrode of precious metal or precious metal alloy, which is highly resistant to recrystallization and to the penetration of lead compounds, is produced when powders of precious metal or powders of precious metal alloys are compacted, sintered and forged and severely cold drawn to a fibrous structure.

It is an object of the present invention to provide an improved spark plug electrode which is substantially impervious to penetration of the lead compounds which are present in aviation fuels.

It is a further object of the present invention to provide an improved electrode for spark plugs characterized by having a temperature of recrystallization substantially higher than that of electrodes now used when produced by melting and casting technique.

It is a still further object of the present invention to provide an improved electrode for spark plugs having a fibrous structure throughout.

Other objects and advantages will become apparent from the following description taken in conjunction with the drawings, in which.

It has been found, according to the present invention, that a spark plug electrode, having a retentive fibrous structure, a high degree of resistance to the penetration of lead compounds found in aviation fuel and a temperature of recrystallization substantially higher than that of electrodes of identical or similar composition when produced by other methods, is obtained when a quantity of a powdered precious metal or of a powdered precious metal alloy is firmly compacted to a non-friable body such as a pellet, briquette, compact, or the like, and the body is sintered at an elevated temperature at least 500° C. below the melting point of the body and is then further consolidated or compacted to eliminate porosity while heated to a temperature at least not higher than the sintering temperature under controlled sintering and reheating atmospheres or the compacting, sintering and consolidation may be combined in the well known process of hot pressing and is thereafter further reduced in cross sectional area by cold working and/or wire drawing to a final cold reduction in cross sectional area of at least 75% whereby a wire suitable for use as a spark plug electrode is formed. The precious metals that may be used for the process and product of my invention may be selected from the group comprising platinum, palladium, iridium, rhodium, osmium, ruthenium, gold and silver. The alloying metals which may be used are any of the precious metals recited in the foregoing group excepting platinum, or they may be any base metal having a melting point higher than about 900° C. Examples of such base metals are titanium, zirconium, tantalum, columbium, vanadium, chromium, nickel, copper and tungsten. Such precious metal-base metal alloys should have a precious metal content of at least 50%, at least a part of which should be platinum. Thus, in its preferred embodiment, the present invention contemplates a spark plug electrode wire of pure platinum or of platinum alloyed with one of the other precious metals or with a base metal having a melting point higher than about 900° C.

The powdered metals or powdered metal alloys suitable for use in the present invention may be prepared by grinding or by otherwise reducing by mechanical or by chemical means to a finely powdered form. The metal powder or metal alloy powders may also be prepared from solutions or suspensions of compounds of the metals or alloys in the manner described by Edwin Clements Rhodes in British provisional applications Serial No. 4,514 and Serial No. 4,515, both dated March 10, 1944, or in the corresponding United States application Serial No. 576,709, filed February 7, 1945. The controlled atmosphere in which the sintering and reheating steps are carried out should be one in which no chemical reaction with the metal or the alloy metals will take place and thus the atmosphere should be substantially inert to the metal or metals under treatment, such as a reducing or inert atmosphere or a vacuum. The inert atmosphere may be, for example, hydrogen, nitrogen or a vacuum.

In carrying the invention into practice, it is preferred that a hydrogen atmosphere be employed during the sintering step although an oxygen-free nitrogen atmosphere and a vacuum have given satisfactory results in actual practice. Likewise, in the step following the sintering step in which the sintered compact is further compacted to eliminate porosity, herein referred to as consolidation, it is also preferred that the heating or reheating of the sintered compact should be carried out in an inert atmosphere and preferably at a temperature at least 100° C. to 300° C. below the sintering temperature. It is also preferred that the final cold working operation reduce the cross sectional area at least 90%, e. g. 90% to 98%. Cold reductions in cross sectional areas of 90%, 92% and 98% have given satisfactory results in actual practice.

Control of the sintering temperature, as well as similar control of the temperature of the consolidation step, is a particularly important factor of the present invention since it has a marked influence on the temperature of recrystallization and on the retentiveness of the fibrous structure in the severely cold worked final product. Stated broadly, it has been determined that the recrystallization temperature for severely cold worked platinum, for example, rises as the processing temperature is lowered and that, conversely, as the processing temperature is raised, the temperature of recrystallization is lowered. When the processing temperature approaches the melting point of the metal or alloy, the recrystallization temperature approaches that of a severely cold drawn wire, produced in its preliminary stage of production, by melting and casting methods. Sintered pure platinum, for example, processed between 1300° C. and 1400° C. (i. e. within 500° C. of the melting point of pure platinum) is indistinguishable in respect of its mechanical and recrystallization properties from metal produced by the normal melting and casting methods.

Since it has been generally recognized heretofore that the temperature of recrystallization is generally lower the greater the degree of cold working, the greatly elevated temperature of recrystallization in severely cold worked platinum produced in accordance with the present invention is a novel and surprising result and is a novel characteristic of the product thereof.

For the purpose of giving those skilled in the art a better understanding of the present invention, the following illustrative examples are given:

EXAMPLE 1

As a starting material, a soft platinum sponge produced by ignition of platinum ammonium chloride salt at a temperature between 450° C. and 600° C. was used. The sponge was powdered by attrition, for example, by rubbing on a 90-mesh sieve. The large, harder particles which failed to pass the 90-mesh screen wire were further comminuted by rubbing, and care was required to avoid deformation of the platinum.

The powder was charged into a steel mould and compressed with a pressure of 15 to 20 tons per square inch until a compact was formed which could be easily handled without breakage. The compact thus formed was then sintered and, as stated heretofore, sintering was carried out in an inert atmosphere. It may be effected, for example, in an atmosphere of hydrogen, nitrogen, or in a vacuum, and in the present example an atmosphere of hydrogen was used. The sintering was effected in an electric resistance furnace, and, as stated heretofore, it was under accurately controlled temperature conditions. Thus, the compact was placed in a cold furnace which was brought to temperature in a period of about one hour and was held at that temperature for about one hour. The sintered compact was then removed from the furnace. Since the metal used in the present instance was substantially pure platinum, the highest temperature attained during the sintering step just described was 1200° C. In accordance with the earlier expressed criteria that the sintering temperature should not be higher than 500° C. below the melting point of the metal, or, preferably, below that temperature.

Figure 3:
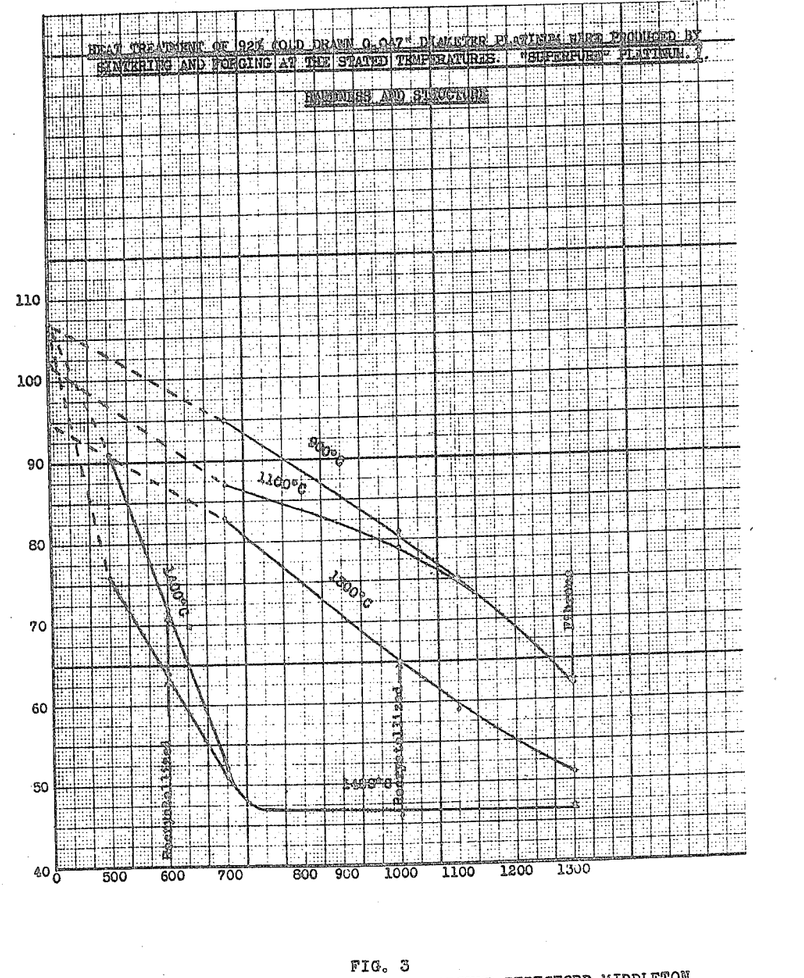
Figs. 3 and 4 are graphic illustrations of the effect of varying temperatures of sintering and forging on the properties and structures of 92% reduced, cold drawn 0.047 inch diameter platinum wire.
Figure 4:
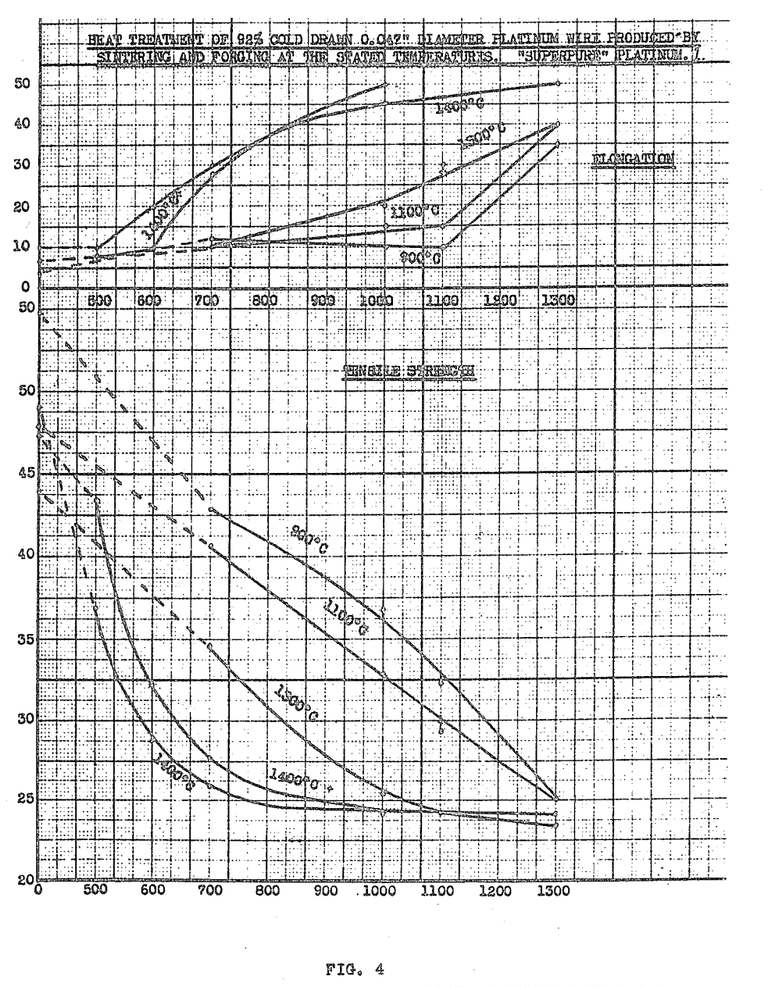
Figure 5:
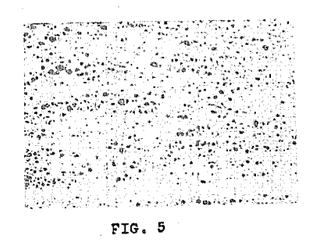
Figs. 5, 6 and 7 are reproductions of photomicrographs (magnified 100 diameters), showing the microstructure in various stages, from sintered compact to finished platinum wire, produced according to the present invention, these figures showing respectively the microstructure of the sintered compact before consolidation, the sintered compact after consolidation, and the finished platinum wire after 92% cold reduction.

The sintered compact produced in the manner described in the foregoing example is of a highly porous structure, as may be seen in Fig. 5, the porosity being generally of the order of at least 30% of the total volume of the compact and being quite evenly distributed throughout. This porosity must be substantially completely eliminated before the steps of cold reduction and severe cold drawing. Elimination of the porosity of the sintered compact may be accomplished by consolidation, at a suitably raised temperature, such as hand forging or power hammer forging, hand forging having been employed in the present example. As in the sintering step, the temperatures used during consolidation are critical and, preferably, should be below the sintering temperature. The effect of various processing temperatures on the properties and structures of the severely cold drawn wire are shown in Figs. 3 and 4. Thus, the statement made earlier that the recrystallization temperature for severely cold worked platinum rises as the processing temperature is lowered is equally applicable to the consolidation temperature as well as the sintering temperatures and the use of the term "processing temperature" is intended to include both the sintering temperature and the consolidation temperature. The consolidation temperature is preferably lower than the sintering temperature and is accurately controlled. It may be carried out in stages of alternating heating and consolidation and the compact was, therefore, reheated between consolidation stages by insertion into a resistance furnace held at the prearranged temperature. Specifically, the consolidation temperature is preferably 100° C. to 300° C. below the sintering temperature, and in the present instance the furnace temperature was maintained at about 1100° C. An atmosphere of hydrogen was maintained in the furnace during the reheating steps.

Figure 6:
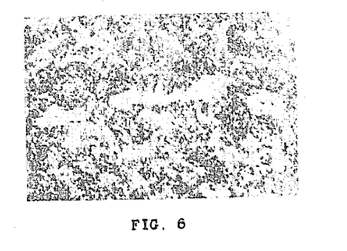

While the bottom limit for the sintering temperature of pure platinum is not of particular significance other than that it necessitates a longer sintering time with a lowering of the sintering temperature, the lower limit of the consolidation temperature is of greater significance since a lower temperature will make consolidation more difficult. Likewise, the amount of consolidation of pure platinum is not particularly significant except, as stated heretofore, that all porosity in the sintered compact should be substantially eliminated. Consolidation may be continued, for example, somewhat after all visible porosity in the sintered compact has been eliminated in order to render the compact more solid. The effect of consolidation is shown in Fig. 6, which is a reproduction of a photomicrograph of the sintered consolidated compact. As will be seen in Fig. 6, the porosity has been substantially eliminated and the initial tendency towards a fibrous microstructure has become apparent.

Figure 7:
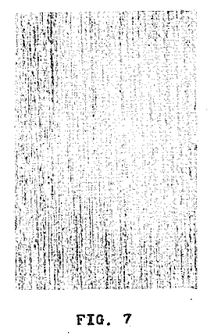

After the consolidation of the sintered compact, as just previously described, was completed, the sintered, consolidated compact was then subjected to cold working, followed by wire drawing, until a cold reduction in cross-sectional area of about 92% was effected. Cold working may be accomplished by rolling between grooved rolls, by cold forging or by swaging and in the present example the cold working was by rolling. The cold working is preferably, and was, in the present example, carried out in stages with a reduction in cross sectional area of 10% for example for each stage, and was continued until the preferred final reduction in cross sectional area of about 92% was attained. As stated in the foregoing, the final stages of cold working may be ordinary wire drawing. The final product in the present example was a severely cold drawn platinum wire of 0.047 inch diameter in which form it was adaptable for subsequent use in the manufacture of spark plug electrodes. The microstructure of the finished, severely cold drawn platinum wire is shown in Fig. 7. It will be seen in this figure that the microstructure is very definitely fibrous, and it will be seen on examining this figure in conjunction with Figs. 5 and 6 that this fibrous microstructure is progressively created by the method steps of the present invention.

Apart from the specific references which have been made in the foregoing description to Figs. 3 to 7, inclusive, Figs. 1 to 4, inclusive, show graphically comparative results in wires produced by the methods of the present invention and in wires produced by normal melting and casting technique.

Figure 1:
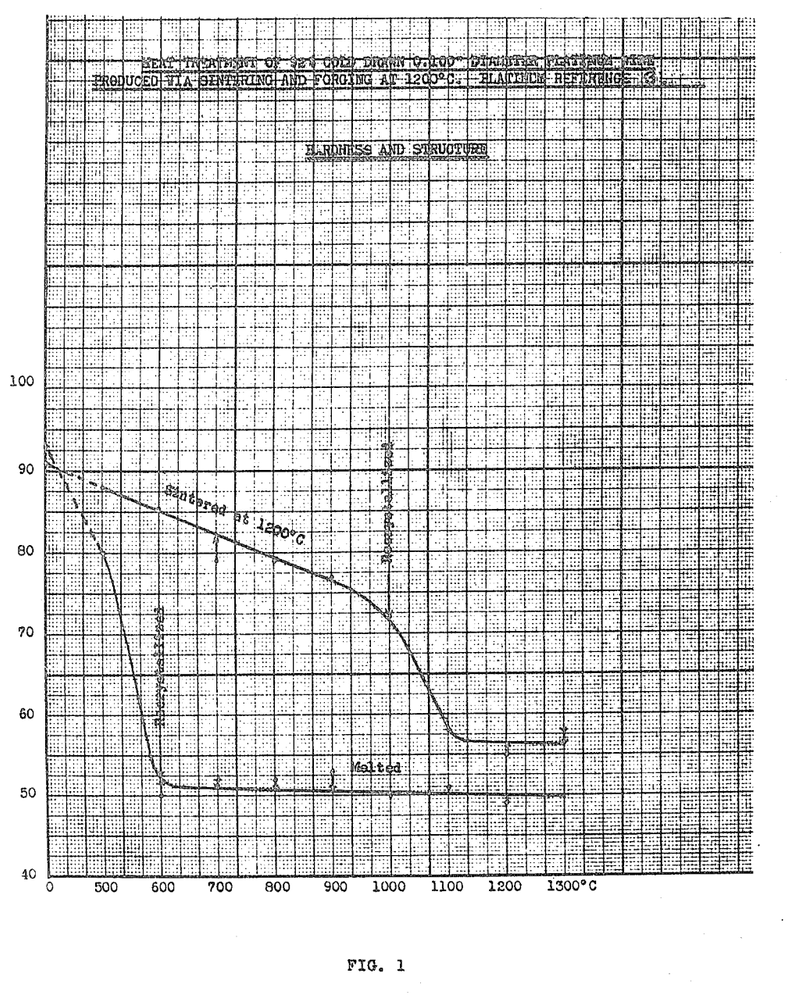
Figs. 1 and 2 illustrate graphically the comparative effects of heat treatment on the properties and structures of 92% reduced, cold drawn 0.100 inch diameter platinum wire produced by sintering and forging at 1200° C. and similar wire produced by melting and casting, followed in both instances by cold working.
Figure 2:
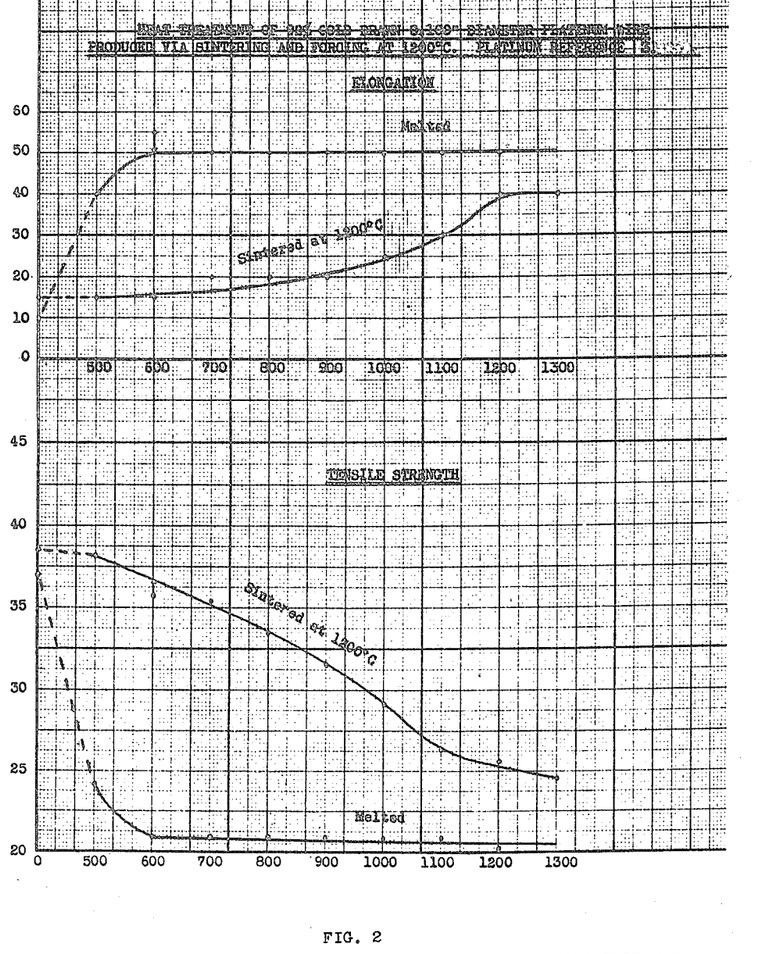

All of these figures show the effect on the hardness and structure, per cent elongation and tensile strength of the metal shown in each graph. In Figs. 1 and 2, for example, the effect on these properties, as well as the effect on the temperature of recrystallization, of heat treatment on 92% cold drawn 0.100 inch diameter platinum wire produced by sintering and forging at 1200° C. in comparison with similar wire produced by melting and casting is shown. The steps subsequent to sintering and forging for the one wire and subsequent to melting and casting for the other wire were identical. The platinum used for the two wires was also identical in composition since platinum debris from the powdered platinum was melted and cast for the comparative wire.

In Figs. 3 and 4 the effect of heat treatment on these properties for 92% cold drawn 0.047 inch platinum wires produced by sintering and forging in the temperature ranges of 900° C. to 1400° C. is shown. It will be seen in Fig. 3, for example, that for the processing temperature of 900° C. and 1100° C., the fibrous structure is retained in the cold drawn wire when heat treated at 1300° C. for 15 minutes, while recrystallization occurred at a heat treating temperature of 600° C. in wire produced by sintering and forging at 1400° C. The recrystallization occurred at a somewhat higher temperature (1000° C.) when the processing temperature was 1300° C.

It will thus be seen that a fibrous structure more retentive than that attained in severely cold drawn wire produced by the normal melting and casting technique is obtained with the raised temperature of recrystallization which results from the methods of the present invention.

Figure 8:
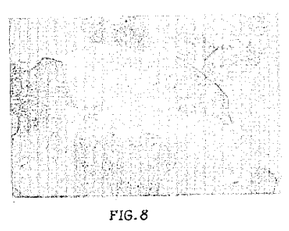
Figs. 8 and 9 depict reproductions of photomicrographs (magnified 100 diameters), showing, respectively, the equiaxed grain structure in platinum wire produced by melting and casting followed by cold working and wire drawing and the columnar crystalline structure of platinum wire produced by sintering and forging followed by cold working and wire drawing and subsequent heat treatment.
Figure 9:
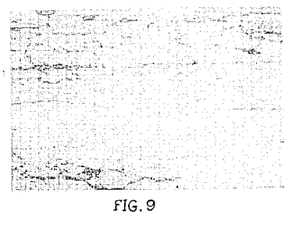

When platinum wire is produced by melting and casting followed by cold working and wire drawing, recrystallization, when it occurs, produces an equiaxed grain structure, as may be seen in the reproduced photomicrograph of Fig. 8. On the other hand, when platinum wire, produced by the consolidation of a sintered compact, followed by cold working and wire drawing in accordance with the methods of the present invention, is subjected to a temperature sufficiently high to cause recrystallization, a columnar crystalline structure, such as that shown in Fig. 9 will occur.

As stated heretofore, the effect on the properties and structure of a severely cold drawn platinum wire produced by the foregoing method is shown in Figs. 1 to 4, Figs. 1 and 2 showing the effect in comparison with the effect on similar wire produced by melting and casting, and Figs. 3 and 4 showing similar comparative effects under varied processing temperatures. It will be noted, for example, in Fig. 1 that the recrystallization temperature of platinum wire produced in accordance with the method of the present invention is 400° C. higher than that of wire produced by melting and casting.

EXAMPLE 2

A platinum-palladium alloy containing 10% palladium was prepared by mixing, in that proportion by weight, platinum and palladium powder of a size passing a 90-mesh sieve. The mixture was compacted under a pressure of 15 tons per square inch, sintered in an atmosphere of hydrogen at a temperature of 1200° C. for three hours, then consolidated to eliminate porosity. The temperature of consolidation was 900° C. The material after consolidation was cold worked in stages of 10% reduction each, until the alloy had been subjected to 92% cold reduction. The severely cold drawn platinum-palladium alloy wire thus produced had a recrystallization temperature of about 1300° C. as compared with a recrystallization temperature of about 900° C. for a melted and cast platinum-palladium alloy of similar composition after identical cold working treatment.

Figure 21:
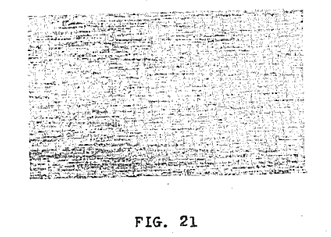
Figs. 21 to 24 are typical microsections of platinum-palladium alloy wires described in Example 2.
Figure 22:
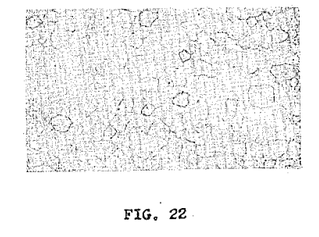
Figure 23:
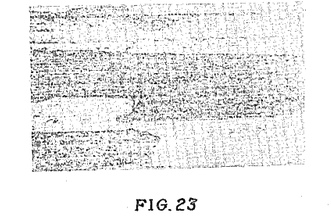
Figure 24:
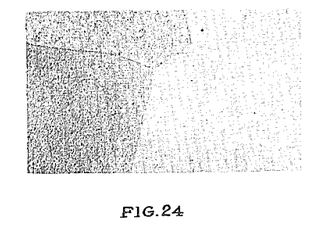

Figs. 21 to 24 illustrate the difference in behaviour on heat treatment of the sintered and melted alloy wires with 92% cold reduction. Thus Fig. 21 shows that wire produced from sintered materials retains the fibrous structure imparted to it by 92% cold reduction after exposure for fifteen minutes to a temperature of 1100° C. On the other hand, as is illustrated in Fig. 22, wire produced from melted and cast material and subjected to 92% cold reduction to impart a fibrous structure thereto is recrystallized after exposure for fifteen minutes to a temperature of 1100° C. When samples similar to those illustrated in Figs. 21 and 22 respectively were exposed to temperatures of 1500° C. for fifteen minutes the results were as illustrated in Figs. 23 and 24. These show that when wire made from sintered material is subjected to a temperature sufficiently high to cause recrystallization a columnar crystalline structure occurs as shown in Fig. 23. On the other hand wire made from melted and cast material when subjected to the same conditions produces an equiaxed structure as may be seen in Fig. 24.

EXAMPLE 3

The production of a platinum-tungsten alloy wire in accordance with the method of the present invention is hereinafter described.

A platinum-tungsten alloy suitable for subsequent processing to a severely cold drawn wire electrode may be produced either from mixtures of the metal powders or from a composite obtained by the ignition of a mixture of compounds of the metals with subsequent reduction in hydrogen. For example, a mixture of ammonium chloro-platinate and tungstic oxide may be used or a mixture of the metal powders. When a mixture of compounds of the metals was used, weighed amounts of the platinum salt and tungstic oxide were lightly ground with sufficient water to give a paste or slurry and the resulting mixture was formed into a pellet or cake and was placed in a cold furnace and gradually heated to approximately 600° C. until all volatile constituents were expelled. The product was then reduced in hydrogen to effect complete reduction of the tungstic oxide and the reduction in hydrogen may be before compacting or may also be obtained by compacting and then sintering in hydrogen. A slight excess of tungstic oxide amounting to about 2½% should be included in the mixture of metal compounds in order to compensate for a slight loss of tungsten during the ignition of the salts.

When a mixture of platinum powder and tungsten powder is used for forming the alloy, the particle size of the powdered platinum, as is the case with platinum alone, is not particularly critical apart from requiring a longer sintering time with an increase in the coarseness of the particles. The particle size of the tungsten powder, however, is more important since, with coarser particles, not only is a considerably longer sintering time required, but difficulties are encountered when working to wire. It is preferred, therefore, in forming the platinum-tungsten alloy to use powdered tungsten of a fineness of about one micron, although as stated earlier, a coarser material may be used with a longer sintering time. The fineness of the platinum powder in the alloy may be, for example, that passing a 90-mesh sieve.

Figure 10:
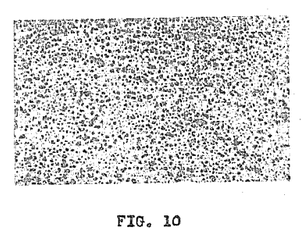
Figs. 10, 11 and 12 are reproductions of photomicrographs similar to those shown in Figs. 5, 6 and 7 and show the microstructure of a platinum-tungsten alloy in the various stages from sintered compact to finished platinum-tungsten wire produced according to the present invention, Fig. 10 showing the microstructure of the sintered compact, Fig. 11 showing the microstructure of the sintered compact after consolidation, and Fig. 12 showing the fibrous microstructure of the finished platinum-tungsten wire after 92% cold reduction.
Figure 11:
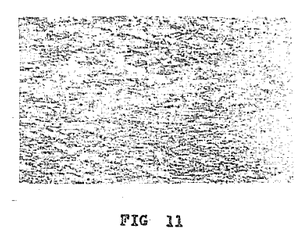

The mixture of metal powders obtained by either of the methods described above was compacted in a mould under a pressure of 15 tons per square inch to obtain a compact which could be easily handled. The compact thus obtained was sintered in hydrogen within a temperature range of 1100° C. to 1300° C. until the formation of the alloy was complete. The sintered compact thus formed is porous, as may be seen in the photomicrograph reproduced in Fig. 10, which shows the microstructure of the compact of a 96% platinum-4% tungsten alloy after sintering at 1200° C. This sintering generally required three hours. The sintered compact, after being allowed to cool in the furnace, was then subjected to consolidation by swaging until all porosity in the sintered compact was eliminated. The consolidation was carried out in stages, preferably of about 10% reduction for each stage with alternating reheating between stages. Reheating was carried out in a tube furnace maintained at a temperature of 1100° C. to 1200° C. It will be seen on examination of Fig. 11 that the porosity of the sintered compact has been substantially eliminated by the consolidation step and that this structure indicates a tendency towards the fibrous structure which becomes more clearly defined after the cold working steps.

The elimination of voids in the sintered compact will generally require a reduction in cross sectional area during the consolidation stage to a total of about 75%. Reheating between consolidation stages, in addition to the aforesaid careful control of temperature, should be carried out in an atmosphere of hydrogen.

Figure 12:
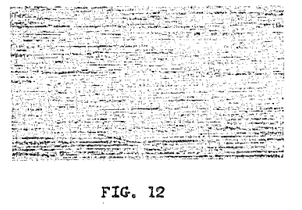

After eliminating all porosity in the sintered compact by the consolidation steps just previously described, a further reduction was made by cold rolling to give finished wire of about 92% cold reduction. The fibrous microstructure of the finished wire after about 92% cold reduction is shown in Fig. 12 which is a reproduction of a photomicrograph at a magnification of 100 diameters, of the severely cold drawn 96% platinum-4% tungsten alloy wire.

Figure 13:
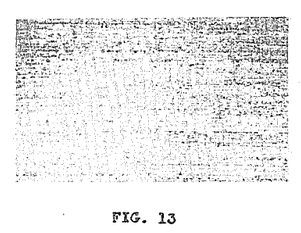
Fig. 13 shows, in a reproduction of a photomicrograph, the effect of 72 hours of heat treatment at 1200° C. on 4% tungsten-platinum wire produced according to the method of the present invention with a final cold reduction of 92%.
Figure 14:
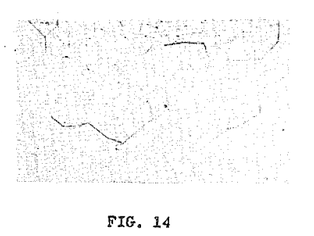
Fig. 14 shows the comparative effect of identical heat treatment on 4% tungsten-platinum wire produced by melting and casting with a final cold reduction of 92%.
Figure 15:
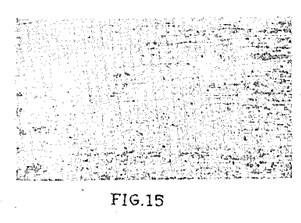
Figs. 15 and 16 show comparative effects like those shown in Figs. 13 and 14, respectively, with the heat treatment prolonged to 144 hours at 1200° C.
Figure 16:
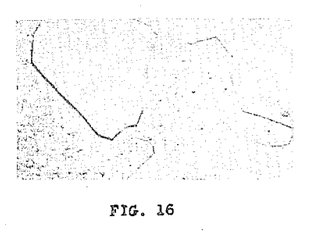
Figure 17:
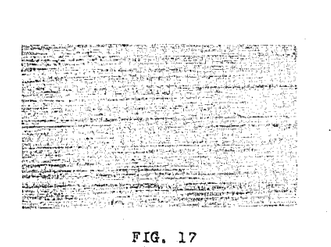
Figs. 17 to 20 are typical microsections of some of the platinum-tungsten alloy wires described in Table 5.

The permanence of the fibrous structure which is imparted to a platinum-tungsten alloy wire, when produced from a sintered compact which has been subjected to consolidation and subsequent cold working in accordance with the method of the present invention with subsequent heat treatment at 1200° C. for prolonged periods of time, is shown in Figs. 13 and 15 in comparison with Figs. 14 and 16 for a platinum-tungsten alloy wire produced by melting and casting followed by similar consolidation and cold working and similar subsequent heat treatment. Fig. 13 shows the effect of 72 hours of heat treatment at 1200° C. on the microstructure of an 0.047 inch diameter platinum-tungsten alloy wire produced by the methods of the present invention and Fig. 14 shows the comparative effect of identical heat treatment on a similar wire produced by melting and casting. Similarly, Figs. 15 and 16 show, respectively, comparative effects such as those shown in Figs. 13 and 14 when the heat treatment at 1200° C. was prolonged to 144 hours.

Further comparative effects of heat treatment of platinum-tungsten alloy wires for varying heat treating temperatures, varying heat treating periods and varying compositions of the platinum-tungsten alloy are shown in the photomicrographs reproduced in Figs. 17, 18, 19, and 20.

ture of heat treatment was 1300° C. and the heat treating time was 15 minutes. The wires shown in both of these figures were of a 4% tungsten-platinum alloy, the wire of Fig. 17 having been produced by the method of the present invention and that of Fig. 18 having been produced by melting and casting technique. The wires, the microstructures of which are reproduced in the remaining figures, i. e., Figs. 19 and 20 were, respectively, alloys of 4.40% tungsten-platinum, and 3.83% tungsten-platinum, and were produced from mixtures of powdered metals in accordance with the method of the present invention. The wires reproduced in Figs. 19 and 20 were heat treated at 1500° C. for 3 hours. It will also thus be apparent, on comparing these figures with the view shown in Fig. 18, the wire of which was heat treated for only 15 minutes at 1300° C., that the equiaxed microstructure of recrystallization resulting from ordinary melting and casting technique is not evident in wires produced according to the present invention even when the temperature of heat treatment is elevated and the period of heat treatment is prolonged.

The effect of impurities, size of wire, volume of metal powders used for the compact, as well as varying processing temperatures, were all studied during the course of the investigation and reduction to practice.

It was determined, for example, that the volume of metal powder used to form the compact had no significant influence on the properties and structure of the finished wire. Charges of 50 grams and of 300 grams of platinum powder were each compacted and no significant difference was found in the severely cold drawn wire which was subsequently produced when the compacts thus formed were sintered and hot and cold worked in accordance with the methods of the present invention. Similarly, it was found that the properties and structures of the finished wire were substantially identical in wire of 0.100 inch diameter and wire of 0.047 inch diameter.

Results of these studies as well as further illustrations of the beneficial results obtained in practicing the method of the present invention are shown in Tables 1 to 5.

Spectrographic examination was carried out on specimens of the platinum used to determine the incidence of impurities and the results of these examinations are shown in Table 1.

TABLE 1

*Spectrographic analysis of platinum specimens*

| (1) | Rh | Ru | Ir | Pd | Au | Ag | Bi | Pb | Fe | Ni | Zn | Ca | Mg | Si | Cu |
|---|---|---|---|---|---|---|---|---|---|---|---|---|---|---|---|
| 1 | .001 | | | .001 | .001 | .0001 | N. D. | .0001 | .001 | .0002 | | ? Tr | ? Tr | ? Tr | .0003 |
| 2 | .002 | | | .030 | .002 | | .0001 | N. D. | .005 | | | Tr | Tr | Tr | .001 |
| 3 | .001 | | | .001 | N. D. | .0001 | N. D. | .0001 | .001 | .0001 | N. D. | Sl. Tr | N. D. | Sl. Tr | .0003 |
| 4 | Tr. | | .002 | .018 | Nil | | | Nil | .008 | | | | | | |
| 5 | .010 | | | .001 | .001 | .0003 | .0001 | .001 | .001 | .0003 | .001 | Sl. Tr | N. D. | Sl. Tr | .0001 |
| 6 | .013 | .02 | .03 | .024 | .002 | .0001 | N. D. | N. D. | .001 | .0003 | .0003 | Tr | Tr | Tr | .001 |

¹ The Specimen Identifications 1–6 represent samples of platinum from various sources.

NOTE.—N. D.=not detected, B. D. T.=barely detectable trace, Sl. Tr.=slight trace, Tr.=trace.

Figure 18:
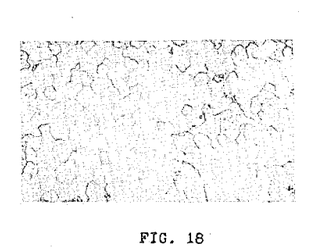
Figure 19:
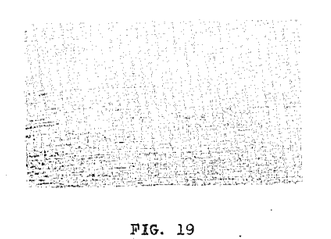
Figure 20:
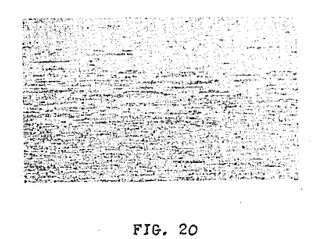

These figures generally demonstrate, excepting Fig. 18, that the fibrous structure is retained at various heat treating temperatures for varying periods and in platinum-tungsten alloys of various compositions. For the samples reproduced in photomicrographs Figs. 17 and 18, the tempera- These specimens were also examined for the presence of As, Sb, Sn, Al, B, Ba, Be, Cd, Cr, Cs, In, K, Li, Mn, Mo, Sr, Zr, Ti, Th and V and none was detected (N. D.) except for a barely detectable trace (B. D. T.) of boron in specimens 3 and 5.

TABLE 2

*Annealing temperature*

| Material | | 92% Cold Drawn | 500° C. | 600° C. | 700° C. | 800° C. | 900° C. | 1000° C. | 1100° C. | 1200° C. | 1300° C. |
|---|---|---|---|---|---|---|---|---|---|---|---|
| Specimen 3. Sintered at 1200° C. and worked at approximately 1200° C. | D. P. N. | 91 | 88 | 86 | 79 | 79 | 77 | 72 | 58 | 55 | 58 |
| | T/S in p. s. i. | 38,500 | 38,100 | 35,700 | 35,400 | 33,500 | 31,600 | 29,100 | 26,300 | 25,700 | 24,600 |
| | Per cent elongation. | 15 | 15 | 15 | 20 | 20 | 20 | 25 | 30 | 40 | 40 |
| | Structure. | (¹) | (¹) | (¹) | (¹) | (¹) | (¹) | (²) | (²) | (²) | (²) |
| Specimen 3. Melted. | D. P. N. | 93 | 80 | 50 | 52 | 52 | 53 | 50 | 51 | 49 | |
| | T/S in p. s. i. | 37,000 | 24,100 | 20,800 | 20,800 | 20,900 | 20,800 | 20,800 | 20,800 | 20,200 | |
| | Per cent elongation. | 10 | 40 | 55 | 50 | 50 | 50 | 50 | 50 | 50 | |
| | Structure. | (¹) | (³) | (²) | (²) | (²) | (²) | (²) | (²) | (²) | |
| Specimen 6. Sintered at 1200° C. and worked at approximately 1200° C. | D. P. N. | 102 | | | | | | 68 | | | 51 |
| | T/S in p. s. i. | 45,600 | | | | | | 27,100 | | | 24,200 |
| | Per cent elongation. | 7 | | | | | | 40 | | | 50 |
| | Structure. | (¹) | | | | | | (²) | | | (²) |

¹ Fibrous.  ² Recryst.  ³ Partial recryst.

NOTES.—Melted metal recrystallized with equiaxed grains. Sintered samples recrystallized with columnar crystals. D. P. N.—Diamond Pyramid Number. T/S in p. s. i.—Tensile strength in pounds per square inch. Recryst.—Recrystallization.

The recrystallization properties of all the samples of Table 1 were studied after processing by sintering at 1200° C. and forging at a temperature of approximately 1200° C. The results obtained for platinum specimen number 3 were representative and typical and are shown in Table 2 in comparison with platinum of the same specimen produced by melting.

The platinum used in the sintered specimen and that used in the melted specimen are actually identical since platinum debris from the sintered specimen was torch melted on a lime hearth using an oxidizing flame and the resulting cast was processed to wire in the same manner as was the compacted sintered specimen. A specimen of the platinum number 6 was also included for comparative tests. All of these results demonstrate clearly the beneficial effects on the properties of wire producing according to the methods of the present invention when compared with normal melting and casting procedures. They also demonstrate that the beneficial effects obtained are not peculiar to metal from a single source.

The effects of heat treatment of platinum wire of 0.047" diameter produced by sintering and forging at different temperatures are summarized in Table 3.

TABLE 3

*The effects of various heat treatments on specimens of platinum wire 0.047" diameter produced via sintering and forging metal at different temperatures (specimen No. 1—See Table 1)*

| Sintering and forging Temperature, °C. | Properties | 92% Cold Reduction | Annealing Temperature, °C. | | | | | |
|---|---|---|---|---|---|---|---|---|
| | | | 500 | 600 | 700 | 1000 | 1100 | 1300 |
| 900 | D. P. N. | 107 | | | 95 | 81 | 75 | 54 |
| | T/S in p. s. i. | 54,800 | | | 42,900 | 36,900 | 32,300 | 25,100 |
| | Per Cent Elongation | 4 | | | 12 | 10 | 10 | 35 |
| | Structure | (¹) | | | (¹) | (¹) | (¹) | (¹) |
| 1100 | D. P. N. | 102 | | | 87 | 79 | 75 | 62 |
| | T/S in p. s. i. | 47,900 | | | 40,600 | 32,900 | 29,400 | 25,100 |
| | Per Cent Elongation | 7 | | | 10 | 15 | 15 | 40 |
| | Structure | (¹) | | | (¹) | (¹) | (¹) | (¹) |
| 1300 | D. P. N. | 95 | | | 83 | 65 | 59 | 51 |
| | T/S in p. s. i. | 43,900 | | | 34,600 | 25,400 | 24,200 | 23,400 |
| | Per Cent Elongation | 4 | | | 10 | 20 | 30 | 40 |
| | Structure | (¹) | | | (¹) | (²) | (²) | (²) |
| 1400 | D. P. N. | 106 | 76 | 64 | 51 | 46 | | 47 |
| | T/S in p. s. i. | 49,000 | 36,900 | 28,800 | 25,900 | 24,200 | | 24,200 |
| | Per Cent Elongation | 10 | 10 | 20 | 30 | 45 | | 50 |
| | Structure | (¹) | (¹) | (²) | (²) | (²) | | (²) |
| 1400 (Forged at highest possible temperature.) | D. P. N. | 107 | 91 | 72 | 52 | 46 | | |
| | T/S in p. s. i. | 47,300 | 43,500 | 32,300 | 27,700 | 24,200 | | |
| | Per Cent Elongation | 5 | 8 | 10 | 28 | 50 | | |
| | Structure | (¹) | (¹) | (²) | (²) | (²) | | |

Notes.—D. P. N.—Diamond Pyramid Number. T/S in p. s. i.—Tensile strength in pounds per square inch.
¹ Fibrous.  ² Recrystallized.

It will be noted in the table that the fibrous structure was maintained at 1300° C. when the wire was produced at sintering and forging temperatures of 900° C. and 1100° C., but that recrystallization occurred at a heat treatment temperature of only 600° C. when the sintering and forging temperature was raised to 1400° C.

Results of heat treatment at varying temperatures and for various periods of time on the properties and structures of severely cold drawn 4% tungsten-platinum alloy wires produced by sintering at 1200° C. and consolidation and reheating for the stated time and at 1200° C. are shown in Table 4 with comparative results on wire produced by melting and casting a commercial alloy of similar composition and similarly heat treated.

of a 0.047 inch diameter platinum-4% tungsten wire produced according to the present invention is shown in Figs. 13 and 15. The wires from which these photomicrographs were made had been heat treated at 1200° C. for a period of 72 hours and 144 hours, respectively, and it will be seen that the fibrous microstructure is retained

TABLE 4

Effect of heat treatment on the properties and structure of severely cold drawn 4% tungsten platinum alloy. Wires produced by sintering mixtures of tungsten and platinum powders at 1200° C. consolidating and reheating for the stated time at 1200° C.

| Heat treatment of wire | Alloy, after sintering and consolidating, heated at 1200° C. in nitrogen for stated time, before 92% cold reduction to given diameter ||||||||
|---|---|---|---|---|---|---|---|---|
| | 5 minutes, 0.047" wire |||| 24 hours, 0.047" wire ||||
| | Hardness D. P. N. 5 Kgs./30 secs. | Tensile Strength in p. s. i. | Per cent elongation on 1" | Structure | Hardness D. P. N. 5 Kgs./30 secs. | Tensile Strength in p. s. i. | Per cent elongation on 1" | Structure |
| Nil | 237 | 131,400 | 5 | Fibrous | 237 | 125,100 | 2 | Fibrous. |
| 15 min. at 800° C | 211 | 104,900 | 10 | do | 210 | 101,800 | 15 | Do. |
| 15 min. at 900° C | 194 | 100,300 | 12 | do | 196 | 92,800 | 13 | Do. |
| 15 min. at 1000° C | 188 | 96,900 | 15 | do | 187 | 90,500 | 16 | Do. |
| 15 min. at 1100° C | 180 | 90,800 | 18 | do | 171 | 88,200 | 20 | Do. |
| 15 min. at 1200° C | 169 | 90,500 | 18 | do | 169 | 83,600 | 27 | Do. |
| 15 min. at 1300° C | 169 | | | do | 169 | | | Do. |
| 24 hrs. at 1200° C | 161 | 76,100 | 20 | do | | | | |
| 48 hrs. at 1200° C | 157 | | | do | | | | |
| 72 hrs. at 1200° C | 154 | | | do | | | | |
| 120 hrs. at 1200° C | 140 | | | do | | | | |
| 144 hrs. at 1200° C | 140 | | | do | | | | |
| Figure No. | 13 and 15 |||| | | | |

| Heat treatment of wire | Alloy, after sintering and consolidating, heated at 1200° C. in nitrogen for stated time, before 92% cold reduction to given diameter |||| Commercial alloy, 4.2% tungsten Melted and Cast, 0.047" wire ||||
|---|---|---|---|---|---|---|---|---|
| | 1 hour, 0.100" wire |||| | | | |
| | Hardness D. P. N. 5 Kgs./30 secs. | Tensile Strength in p. s. i. | Per cent elongation on 1" | Structure | Hardness D. P. N. 5 Kgs./30 secs. | Tensile Strength in p. s. i. | Per cent elongation on 1" | Structure |
| Nil | 215 | 105,900 | 10 | Fibrous | 260 | 132,000 | 8 | Fibrous. |
| 15 min. at 800° C | 199 | 91,400 | 10 | do | 222 | 105,000 | 15 | Do. |
| 15 min. at 900° C | 184 | 88,700 | 15 | do | 207 | 92,000 | 20 | Do. |
| 15 min. at 1000° C | 175 | 83,900 | 15 | do | 171 | 81,000 | 27 | Partially Recrystallized. |
| 15 min. at 1100° C | 171 | 80,300 | 15 | do | 151 | 74,000 | 30 | Recrystallized. |
| 15 min. at 1200° C | 162 | 80,700 | 30 | do | 145 | 71,000 | 30 | Do. |
| 15 min. at 1300° C | 157 | 77,300 | 30 | do | 140 | 70,000 | 30 | Do. |
| 24 hrs. at 1200° C | 146 | 76,700 | 28 | do | 135 | | | Do. |
| 48 hrs. at 1200° C | | | | | 135 | | | Do. |
| 72 hrs. at 1200° C | | | | | 135 | | | Do. |
| 120 hrs. at 1200° C | | | | | 135 | | | Do. |
| 144 hrs. at 1200° C | | | | | 133 | | | Do. |
| Figure No. | | | | | 14 and 16 ||| |

Thus, it will be apparent on examination of the results shown in Table 4 that a platinum-tungsten wire produced according to the present invention has a fibrous structure which is highly retentive when heat treated through a range of 800° C. to 1300° C. and has a temperature of recrystallization at least 300° higher than similar wire produced by melting and casting. It will also be apparent that the reheating time before final cold reduction may be varied within wide limits and that the fibrous structure is retained even after prolonged periods of heat treatment. The relation of the data given to the photomicrographs of Figs. 13, 14, 15 and 16 is shown at the bottom of the table.

The permanence of the fibrous microstructure over long periods of time at substantially elevated temperatures. Figs. 14 and 16 show comparative effects in 0.047 inch diameter platinum-4% tungsten wire produced by melting and casting after similar heat treatment for periods of 72 hours and 144 hours, respectively.

Table 5 shows the properties and structure of tungsten-platinum alloy wires with a final cold reduction of 92%, the alloys having been produced from mixed salts of platinum and of tungsten, ignited and sintered in hydrogen at the given temperatures for 3 hours, followed by consolidation and final cold reduction with comparative results being given for a wire produced by melting and casting a commercially available alloy of somewhat similar composition.

TABLE 5

*Properties and structure of 4% tungsten-platinum alloy wires, 0.047" diameter, produced under various conditions with a final cold reduction of 92%*

|  | Commercial alloy. Melted and cast 4.2% W | | Alloys produced from mixed salts, ignited, then sintered in hydrogen at 1200° C. for three hours and then consolidated at 1200° C. to remove porosity | | | |
|---|---|---|---|---|---|---|
|  | | | 3.83% W | | 4.40% W | |
| Tensile strength in p. s. i. as drawn | 132,000 | | 119,000 | | 136,000 | |
| Percent elongation on 1" as drawn | 8 | | 8 | | 8 | |
| Number of 90° bends to fracture | 7 | | 6 | | 6 | |
|  | Hardness D. P. N. | Structure | Hardness D. P. N. | Structure | Hardness D. P. N. | Structure |
| As drawn | 260 | Fibrous | 240 | Fibrous | 265 | Fibrous. |
| 15 min. at 900° C | 207 | ....do | 202 | ....do | 225 | Do. |
| 15 min. at 950° C | 190 | Incipiently Recrystallized | 196 | ....do | 218 | Do. |
| 15 min. at 1000° C | 171 | Partially Recrystallized | 193 | ....do | 215 | Do. |
| 15 min. at 1050° C | 155 | Recrystallized | 188 | ....do | 212 | Do. |
| 15 min. at 1100° C | 151 | ....do | 185 | ....do | 209 | Do. |
| 15 min. at 1150° C | 147 | ....do | 184 | ....do | 206 | Do. |
| 15 min. at 1200° C | 145 | ....do | 181 | ....do | 203 | Do. |
| 15 min. at 1300° C | 140 | ....do | 176 | ....do | 197 | Do. |
| 15 min. at 1350° C |  |  | 172 | ....do | 190 | Do. |
| 15 min. at 1400° C |  |  | 172 | ....do | 187 | Do. |
| 15 min. at 1450° C |  |  | 168 | Recrystallized | 183 | Recrystallized. |
| 15 min. at 1500° C | 133 | Recrystallized | 162 | ....do | 175 | Do. |
| 2 hours at 1500° C |  |  | 159 | ....do | 169 | Do. |
| Figure No | 18 | | 20 | | 17 and 19 | |

The properties and structures are shown after heat treatment for varying time periods at various temperatures. The relation of the data to the photomicrographs of Figs. 17, 18, 19 and 20 of the drawing is given at the bottom of the table.

It is common practice to compare the relative efficiency of spark plug electrodes by exposing them to the corrosive action of lead at a temperature of 800° to 900° C. for a period of several hours. The amount of penetration of the lead into the electrode gives an indication of the relative extent of penetration which may be expected from the lead compounds ordinarily used in high octane motor fuel.

Two wires of a 96% platinum-4% tungsten alloy, one of which was prepared by mixing and compacting powders of the metals in the desired proportions and subsequently sintering the compact at 1200° C. in hydrogen, followed by consolidation and cold working according to the method described hereinbefore, and the other of which was made by normal melting and casting technique were tested by the aforesaid hot lead method. Both wires were subjected in the cold to a reduction in cross-sectional area amounting to 98% to produce a fibrous microstructure and were then exposed under identical conditions to the corrosive active of lead at a temperature of 900° C. for 2 hours. At the end of the period it was found that the wire produced from the cast alloy was completely penetrated by the lead and was so reduced in strength that it suffered severe deformation under a bending stress of 1500 pounds per square inch, whereas the wire produced from powdered metal in accordance with the methods described for the present invention was only penetrated to a depth of about one-half of that of the cast alloy wires and showed practically no deformation under the same bending stress.

The spark plug electrodes produced in accordance with the present invention from a powdered precious metal or a powdered precious metal alloy have a highly retentive fibrous structure, highly resistant to the penetration of the lead compounds ordinarily used in high octane motor fuels and have a temperature of recrystallization at least 300° C. higher than that of an electrode produced by normal melting and casting technique.

The terms "precious metal" and "processing temperatures" as used in the present specification and claims have been hereinbefore defined. Use of the term "powdered precious metal alloys" is intended to include mechanical mixtures of powdered platinum with powder of one or more of the other precious metals or with powders of any of the base metals hereinbefore recited, or alloy powders obtained by ignition and subsequent comminution of any mechanical mixture of any compound of platinum with a compound of one of the other precious metals, or with a compound of any of the base metals hereinbefore recited. The term also includes powders produced by comminuting, pulverizing, or otherwise reducing by mechanical or chemical means to fine particle size, an alloy of platinum with one or more of the other precious metals or with one or more of the aforesaid base metals.

The use of the term "alloying metal" in the appended claims is intended to include any of the base metals recited herein or any of the precious metals other than platinum.

Although the present invention has been described in some detail in conjunction with certain specific illustrative examples and preferred embodiments, it will be understood that variations and modifications may be made as those skilled in the art will readily understand. Thus, an electrode may be made with alloying metals other than palladium and other than tungsten. Such variations and modifications are to be considered within the purview of the present specification and the scope of the appended claims.

I claim:

1. A method for the manufacture of platinum-palladium alloy wire electrodes adaptable for use in spark plugs of high efficiency internal combustion engines, which comprises forming a mixture of finely powdered platinum and finely powdered palladium with the platinum powder comprising 90% and the palladium powder comprising 10% of the mixture, compressing the powdered mixture to a shaped compact, sintering the shaped compact in an atmosphere of hydrogen and at a sintering temperature of about 1200° C., consolidating the sintered compact in an atmosphere of hydrogen and at a temperature of about 900° C. until porosity is substantially eliminated, and thereafter cold working in successive stages of about 10% reduction for each stage until a total cold reduction of about 92% has been attained whereby an electrode is obtained having a highly retentive fibrous structure, a temperature of recrystallization of about 1300° C., and a high degree of resistance to the penetration of lead and lead compounds.

2. A method for the manufacture of electrodes adaptable for use in spark plugs of high efficiency internal combustion engines, which comprises forming a compact consisting of at least 90% finely powdered platinum and the balance finely powdered metal having a melting point higher than 900° C. by the application of pressure to said powders within a mold, removing said compact from said mold, sintering said compact in an atmosphere inert to the metal powders and within a sintering temperature range of 1100° C. to 1200° C. and not exceeding 500° C. below the melting point of said compact, consolidating the sintered compact in an atmosphere inert to the compact and within a temperature range of 900° C. to 1200° C. but not exceeding the sintering temperature employed until all voids are substantially eliminated, and thereafter further reducing the cross-sectional area of the compact by cold working to obtain a reduction in cross-sectional area of at least 90%, whereby a severely cold drawn wire is manufactured having a highly retentive fibrous structure, a temperature of recrystallization substantially higher than normal, and a high degree of resistance to the penetration of lead and lead compounds.

ARTHUR BERESFORD MIDDLETON.

REFERENCES CITED

The following references are of record in the file of this patent:

UNITED STATES PATENTS

| Number | Name | Date |
|---|---|---|
| 1,236,384 | Fahrenwald | Aug. 7, 1917 |
| 1,719,128 | Reeve | July 2, 1929 |
| 1,896,606 | Bates | Feb. 7, 1933 |
| 2,188,771 | Welch | Jan. 30, 1940 |
| 2,406,172 | Smithells | Aug. 20, 1946 |

FOREIGN PATENTS

| Number | Country | Date |
|---|---|---|
| 546,898 | Great Britain | Aug. 4, 1942 |

OTHER REFERENCES

Jones: "Powder Metallurgy," published by Edward Arnold & Co., London, 1937, pages 60, 116–119.

Wulff: "Powder Metallurgy," published by ASM, Cleveland, Ohio, 1942, pages 5–9.